("12") United States Patent
Bonnefoy

(10) Patent No.: US 11,827,380 B2
(45) Date of Patent: Nov. 28, 2023

(54) SYSTEM AND METHOD FOR POSITIONING A SUB-ASSEMBLY FOR INSTALLATION

(71) Applicant: The Boeing Company, Chicago, IL (US)

(72) Inventor: Pierig Bonnefoy, Chuzelles (FR)

(73) Assignee: The Boeing Company, Arlington, VA (US)

( * ) Notice: Subject to any disclaimer, the term of this patent is extended or adjusted under 35 U.S.C. 154(b) by 11 days.

(21) Appl. No.: 17/570,229

(22) Filed: Jan. 6, 2022

(65) Prior Publication Data

US 2022/0234759 A1 Jul. 28, 2022

Related U.S. Application Data

(60) Provisional application No. 63/141,949, filed on Jan. 26, 2021.

(51) Int. Cl.
*B64F 5/10* (2017.01)
*B23Q 1/25* (2006.01)
*B64F 5/50* (2017.01)

(52) U.S. Cl.
CPC ............ *B64F 5/10* (2017.01); *B23P 2700/01* (2013.01); *B23Q 1/25* (2013.01); *B64F 5/50* (2017.01)

(58) Field of Classification Search
CPC .......... B64F 5/10; B64F 5/50; B23P 2700/01; B62D 65/02
See application file for complete search history.

(56) References Cited

U.S. PATENT DOCUMENTS 4,527,783 A * 7/1985 Collora ................. B25B 11/005
269/297
4,861,008 A 8/1989 Steele et al.
5,141,093 A * 8/1992 Alexander ............. B62D 65/02
198/346.2

(Continued)

FOREIGN PATENT DOCUMENTS

DE 202017105281 9/2017
EP 3363588 8/2018
WO 2014023284 2/2014

OTHER PUBLICATIONS

Extended European Search Report for EP Application No. 22152698.1 dated Jun. 8, 2022.

*Primary Examiner* — Michael W Hotchkiss
(74) *Attorney, Agent, or Firm* — Kunzler Bean & Adamson

(57) ABSTRACT

Disclosed herein in a system for positioning a sub-assembly for installation. The system comprises a tool comprising a base and a sub-assembly support. The sub-assembly support is positioned above the base and pivotably mounted to the base at a pivot axis. The tool is positioned adjacent to an interior surface of an assembling body and configured to support a sub-assembly. The system also comprises at least one actuator that is selectively operable to tilt a first surface of the sub-assembly support toward an opening in the assembling body and adjust an angle of the sub-assembly support, relative to the base. The system further comprises an interior conforming device attached to the tool and configured to interface with the interior surface of the assembling body. The system additionally comprises an exterior conforming device configured to interface with the exterior surface of the assembling body.

20 Claims, 7 Drawing Sheets

(56) References Cited

U.S. PATENT DOCUMENTS

| | | | | |
|---|---|---|---|---|
| 5,619,784 | A * | 4/1997 | Nishimoto | B62D 65/04 29/430 |
| 5,701,651 | A | 12/1997 | Groves et al. | |
| 6,158,666 | A * | 12/2000 | Banks | B21J 15/142 238/10 R |
| 7,429,035 | B2 * | 9/2008 | Metcalf | B66C 23/48 254/4 B |
| 7,575,408 | B2 * | 8/2009 | Tominaga | B25J 15/0061 414/801 |
| 7,596,843 | B2 * | 10/2009 | Spishak | B64F 5/10 269/48.2 |
| 7,980,796 | B1 * | 7/2011 | Salt | B64F 5/10 410/43 |
| 8,291,566 | B2 * | 10/2012 | Ushio | B66C 1/0218 29/407.08 |
| 9,003,646 | B2 * | 4/2015 | Kim | B23P 21/004 29/799 |
| 10,654,138 | B2 * | 5/2020 | Hirai | G06Q 10/06 |
| 10,899,404 | B2 * | 1/2021 | Perkins | B25J 15/0616 |
| 10,906,157 | B2 * | 2/2021 | Olberg | B25H 1/10 |
| 11,034,464 | B2 * | 6/2021 | Hirai | B21J 15/28 |
| 11,040,783 | B2 * | 6/2021 | Ishida | B23P 19/04 |
| 11,136,144 | B2 * | 10/2021 | Bell | B64F 5/50 |
| 2006/0284047 | A1 * | 12/2006 | Spishak | B64F 5/10 248/637 |
| 2010/0135754 | A1 * | 6/2010 | Weber | B64F 5/10 414/222.04 |
| 2013/0158697 | A1 * | 6/2013 | Stone | B64F 5/50 29/897 |
| 2013/0206710 | A1 * | 8/2013 | Roschat | B64F 5/00 211/13.1 |
| 2013/0325159 | A1 * | 12/2013 | Kilibarda | G05B 19/41895 701/25 |
| 2014/0182488 | A1 * | 7/2014 | Lu | A47B 27/16 108/6 |
| 2014/0353894 | A1 * | 12/2014 | DesJardien | B64F 5/10 269/21 |
| 2015/0266147 | A1 * | 9/2015 | Reid | B64F 5/10 29/525.01 |
| 2015/0314889 | A1 * | 11/2015 | Day | B64F 5/10 408/69 |
| 2016/0167809 | A1 * | 6/2016 | Jurbert | B64F 5/10 29/428 |
| 2016/0257428 | A1 * | 9/2016 | Batt | B23P 19/105 |
| 2019/0001398 | A1 * | 1/2019 | Varrelmann | B21J 15/142 |
| 2019/0241225 | A1 * | 8/2019 | D'Souza | B62D 65/026 |
| 2020/0223559 | A1 * | 7/2020 | Oberst | B23Q 1/28 |

* cited by examiner

SYSTEM AND METHOD FOR POSITIONING A SUB-ASSEMBLY FOR INSTALLATION

FIELD

This disclosure relates generally to the positioning of a sub-assembly for installation, and more particularly to a system and method for positioning a sub-assembly for installation to a main assembly.

BACKGROUND

The assembly of large structures, such as airplanes, is typically performed on a factory floor where parts are moved into installation positions to be installed to and partially form the large structure. In the case of an airplane, parts to be installed on the airplane, such as sub-assemblies of a fuselage, can be assembled together to form the fuselage in an assembly line.

A moving assembly line, such as a pulse line, can be utilized. In a pulse line, parts to be installed are positioned sequentially in a straight or U-shaped line on the factory floor. The parts stay at those positions while the large structure (e.g., an aircraft fuselage) is moved through the pulse line. The large structure will remain in one location along the pulse line until all the parts at that location are installed and other planned work is completed, then the large structure is moved (i.e. pulsed) to the next location. Existing solutions primarily use manual processes for locating, moving, and positioning of parts, which leads to long installation times and is labor intensive. Accordingly, the time and labor inefficiencies of manual processes can slowdown the assembly of large structures in the assembly line, which can result in rate requirements, such as for an aircraft fuselage assembly line, to be missed.

SUMMARY

The subject matter of the present application has been developed in response to the present state of the art, and in particular, in response to shortcomings of conventional installation and assembly processes and systems. Accordingly, the subject matter of the present application provides a system and method for positioning a sub-assembly for installation that overcome at least some of the above-discussed shortcomings of conventional processes and systems.

Disclosed herein in a system for positioning a sub-assembly for installation. The system comprises a tool comprising a base and a sub-assembly support. The sub-assembly support is positioned above the base and pivotably mounted to the base at a pivot axis. The tool is positioned adjacent to an interior surface of an assembling body and configured to support a sub-assembly. The system also comprises at least one actuator comprising a first end that is attached to the sub-assembly support and a second end that is attached to the base. The at least one actuator is selectively operable to tilt a first surface of the sub-assembly support toward an opening in the assembling body and adjust an angle of the sub-assembly support, relative to the base. The sub-assembly support is selectively adjustable between a loading position, distant from the opening in the assembling body, and an install position, adjacent to the opening in the assembling body. The system further comprises an interior conforming device attached to the tool. The interior conforming device is configured to interface with the interior surface of the assembling body when the sub-assembly support is in the install position. The system additionally comprises an exterior conforming device, discrete from the tool, and positioned adjacent to an exterior surface of the assembling body. The exterior conforming device configured to interface with the exterior surface of the assembling body. The preceding subject matter of this paragraph characterizes example 1 of the present disclosure.

The assembling body is an aircraft fuselage. The preceding subject matter of this paragraph characterizes example 2 of the present disclosure, wherein example 2 also includes the subject matter according to example 1, above.

The opening in the assembling body is a door frame opening and the sub-assembly is a door frame sub-assembly. The tool is configured to position the door frame sub-assembly within the door frame opening of the aircraft fuselage. The preceding subject matter of this paragraph characterizes example 3 of the present disclosure, wherein example 3 also includes the subject matter according to example 2, above.

The tool is selectively movable relative to the interior surface of the assembling body along a floor beneath the tool. The preceding subject matter of this paragraph characterizes example 4 of the present disclosure, wherein example 4 also includes the subject matter according to any one of examples 1-3, above.

The system further comprises an automated guide vehicle. The tool is selectively movable using the automotive guide vehicle. The automated guide vehicle is configured to move the tool adjacent to the interior surface of the assembling body by sensing at least one reference guide on the floor beneath the tool. The preceding subject matter of this paragraph characterizes example 5 of the present disclosure, wherein example 5 also includes the subject matter according to example 4, above.

The interior conforming device comprises a plurality of pins. The plurality of pins permanently extend from an interfacing surface of the interior conforming device. The plurality of pins is configured to contact the interior surface of the assembling body. The preceding subject matter of this paragraph characterizes example 6 of the present disclosure, wherein example 6 also includes the subject matter according to any one of examples 1-5, above.

Alternatively, the interior conforming device comprises a plurality of pins. The plurality of pins selectively retractable from an interfacing surface of the interior conforming device. The plurality of pins is configured to contact the interior surface of the assembling body. The preceding subject matter of this paragraph characterizes example 7 of the present disclosure, wherein example 7 also includes the subject matter according to any one of examples 1-5, above.

The interior conforming device comprises a first interior conforming device armature and a second interior conforming device armature. The first interior conforming device armature is configured to interface with the interior surface on a first side of the opening in the assembling body. The second interior conforming device armature is configured to interface with the interior surface on a second side, spaced apart from the first side, of the opening in the assembling body. The preceding subject matter of this paragraph characterizes example 8 of the present disclosure, wherein example 8 also includes the subject matter according to any one of examples 1-7, above.

The exterior conforming device comprising a plurality of pins. The plurality of pins is selectively retractable from an interfacing surface of the exterior conforming device. The plurality of pins is configured to contact the exterior surface of the assembling body. The preceding subject matter of this paragraph characterizes example 9 of the present disclosure, wherein example 9 also includes the subject matter according to any one of examples 1-8, above.

The exterior conforming device comprises a first exterior conforming device armature and a second exterior conforming device armature. The first exterior conforming device armature is configured to interface with the exterior surface on a first exterior side of the opening in the assembling body. The second exterior conforming device armature is configured to interface with the exterior surface on a second exterior side, spaced apart from the first exterior side, of the opening in the assembling body. The preceding subject matter of this paragraph characterizes example 10 of the present disclosure, wherein example 10 also includes the subject matter according to any one of examples 1-9, above.

The exterior conforming device is fixed relative to the exterior surface of the assembling body. The preceding subject matter of this paragraph characterizes example 11 of the present disclosure, wherein example 11 also includes the subject matter according to any one of examples 1-10, above.

Alternatively, the exterior conforming device is selectively movable relative to the exterior surface of the assembling body. The preceding subject matter of this paragraph characterizes example 12 of the present disclosure, wherein example 12 also includes the subject matter according to any one of examples 1-10, above.

The assembling body is secured to a conveyor system attached to the floor. The assembling body is moved along the conveyor system at a specified pulse rate. The preceding subject matter of this paragraph characterizes example 13 of the present disclosure, wherein example 13 also includes the subject matter according to any one of examples 1-12, above.

Further disclosed herein is a system for positioning a sub-assembly for installation. The system comprises a tool comprising a base and a sub-assembly support. The sub-assembly support is positioned above the base and pivotably mounted to the base at a pivot axis. The tool is positioned adjacent to an interior surface of an assembling body. The system also comprises at least one actuator comprising a first end, attached to the sub-assembly support, and a second end, attached to the base. The at least one actuator is selectively operable to tilt a first surface of the sub-assembly support toward an opening in the assembling body and adjust an angle of the sub-assembly support relative to the base. The sub-assembly support is selectively adjustable between a loading position, distant from the opening in the assembling body, and an install position, adjacent to the opening in the assembling body. The system also comprises a first interior conforming device armature attached to the tool. The first interior conforming device armature comprising a plurality of pins selectively retractable from an interfacing surface and configured to interface with the interior surface on a first side of the opening in the assembling body when the sub-assembly support is in the install position. Additionally, the system comprising a second interior conforming device armature attached to the tool. The second interior conforming device armature comprising a plurality of pins selectively retractable from an interfacing surface and configured to interface with the interior surface on a second side, apart from the first side, of the opening in the assembling body when the sub-assembly support is in the install position. The system further comprises a first exterior conforming device armature discrete from the tool and positioned adjacent to an exterior surface of the assembling body. The first exterior conforming device armature comprising a plurality of pins selectively retractable from an interfacing surface and configured to interface with the exterior surface on a first exterior side of the opening in the assembling body. Additionally, the system comprises a second exterior conforming device armature discrete from the tool and positioned adjacent to the exterior surface of the assembling body. The second exterior conforming device armature comprising a plurality of pins selectively retractable from an interfacing surface and configured to interface with the exterior surface on a second exterior side of the opening in the assembling body. The preceding subject matter of this paragraph characterizes example 14 of the present disclosure.

Additionally, disclosed herein in a method for positioning a sub-assembly for installation. The method comprises placing a sub-assembly on a sub-assembly support. The sub-assembly support positioned above a base on a tool and pivotably mounted at a pivot axis to the base. The method also comprises activating at least one actuator, attached to the sub-assembly support and the base, to tilt a first surface of the sub-assembly support along the pivot axis. The sub-assembly support tilting toward an opening in an assembling body. The method further comprises engaging an interior conforming device attached to the tool to interface with an interior surface of the assembling body. Additionally, the method comprises engaging an exterior conforming device adjacent to an exterior surface of the assembling body to interface with the exterior surface of the assembling body. The preceding subject matter of this paragraph characterizes example 15 of the present disclosure.

The method further comprises adjusting an adjustment wheel on the sub-assembly support to bring the first surface of the sub-assembly support to an install position, adjacent to the opening in the assembling body. The method also comprises installing the sub-assembly support to the opening in the assembling body. Additionally, the method comprises activating the at least one actuator to pivot the first surface of the sub-assembly support away from the opening in the assembling body to decline the sub-assembly support to a loading position. The preceding subject matter of this paragraph characterizes example 16 of the present disclosure, wherein example 16 also includes the subject matter according to example 15, above.

Additionally, the method comprises moving the tool along a floor, beneath the tool, using an automated guide vehicle. The method also comprises guiding the automated guide vehicle adjacent to the interior surface of the assembling body by sensing at least one reference guide on the floor. The preceding subject matter of this paragraph characterizes example 17 of the present disclosure, wherein example 17 also includes the subject matter according to any one of examples 15-16, above.

The method also comprises extending a plurality of pins from an interfacing surface of the interior conforming device to contact the interior surface of the assembling body when the sub-assembly support is in an install position. The preceding subject matter of this paragraph characterizes example 18 of the present disclosure, wherein example 18 also includes the subject matter according to any one of examples 15-17, above.

The method further comprises moving the exterior conforming device adjacent to the exterior surface of the assembling body. The preceding subject matter of this paragraph characterizes example 19 of the present disclosure, wherein example 19 also includes the subject matter according to any one of examples 15-18, above.

Additionally, the method comprises extending a plurality of pins from an interfacing surface of the exterior conforming device to contact the exterior surface of the assembling body when the sub-assembly support is in an install position. The preceding subject matter of this paragraph characterizes example 20 of the present disclosure, wherein example 20 also includes the subject matter according to any one of examples 15-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

In some examples, the present disclosure provides systems and methods that are configured to position a sub-assembly for later installation of the sub-assembly to an opening in an assembling body. Generally, the process of positioning a sub-assembly adjacent to the opening in an assembling body is a time-consuming, labor-intensive, and manually-driven process. The systems and methods of the present invention can be used to make the process more automated and efficient by providing a tool for supporting the sub-assembly while positioning the sub-assembly. Accordingly, the systems and methods can be used to help ensure a sub-assembly is positioned for installation to an opening in an assembly body both in a timely and labor efficient manner.

Figure 1:
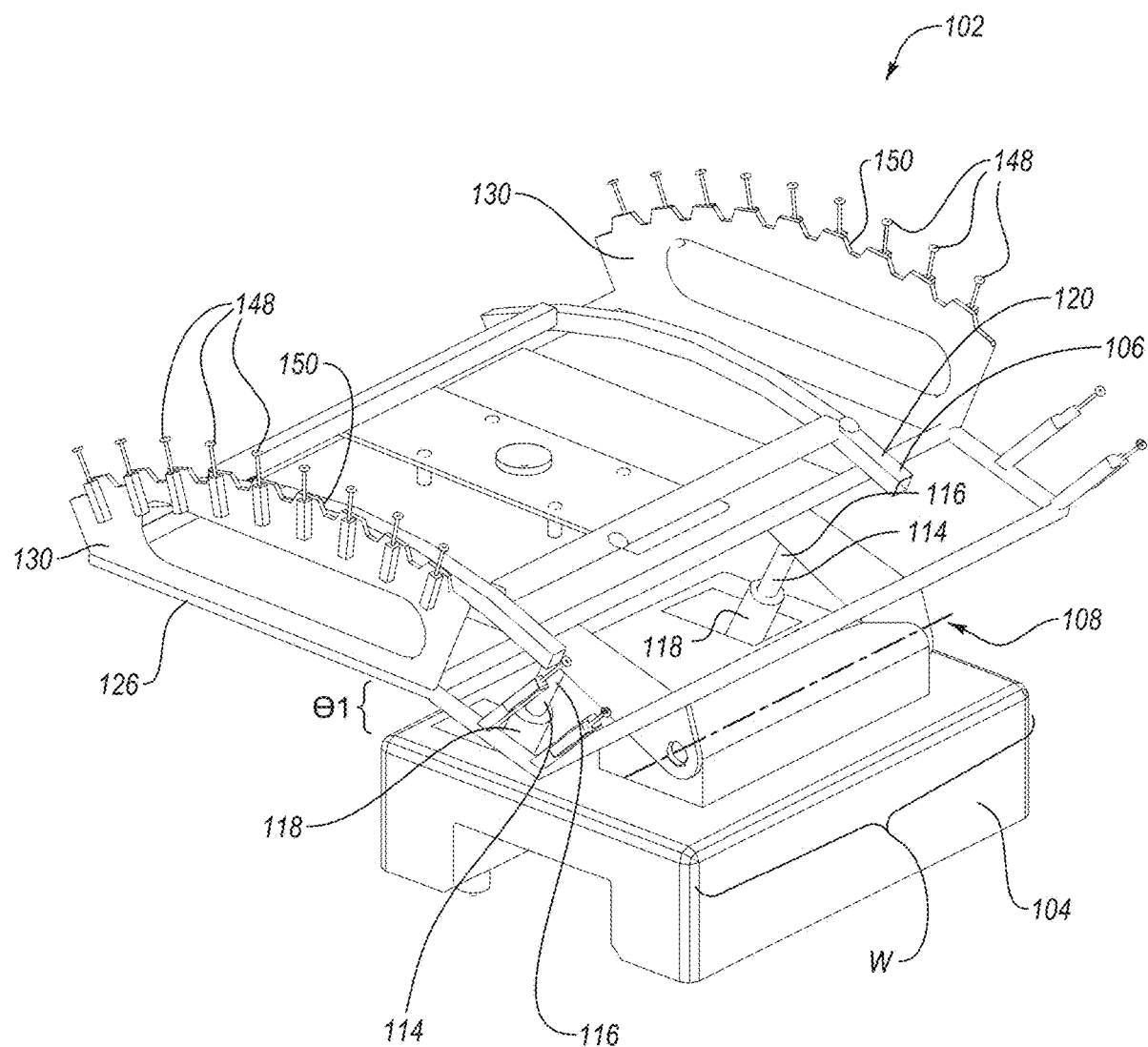
FIG. 1 is a schematic perspective view of a tool for positioning a sub-assembly for installation to an assembling body, according to one or more examples of the present disclosure.

Referring to FIG. 1, and according to some examples, a system 100 that includes a tool 102 for supporting a sub-assembly 101 (see, e.g., FIG. 2) is shown. The tool 102 includes a base 104 and a sub-assembly support 106. The sub-assembly support 106 is positioned above the base 104 and is mounted to the base 106. In one example, the sub-assembly support 106 is mounted to the base at a pivot axis 108. The sub-assembly support 106 is configured to pivot relative to the base 104 between a loading position 126 and an install position 128 (see, e.g., FIG. 5). Pivoting of the sub-assembly support 106 may be controlled by an actuator 114.

The actuator 114, or each one of multiple actuators 114, is selectively operable to tilt a first surface 120 of the sub-assembly support 106 relatively to the base 104. The actuator 114 has a first end 116, attached to the sub-assembly support 106, and a second end 118, attached to the base 104. The actuator 114 may be attached to the sub-assembly support 106 at any location along the width W of the base 104. Additionally, multiple actuators 114 may be attached to the sub-assembly support 106 and work in unison to adjust the angle of the sub-assembly support 106 relative to the base 104. As shown in FIG. 1, the sub-assembly support 106 is at the loading position 126 in which the sub-assembly support 106 defines an angle θ1 relative to the base 104. The loading position 126 is the position in which a sub-assembly 101 can be conveniently placed upon the sub-assembly support 106. In the loading position 126, the actuator(s) 114 are in a lowered or unactuated position. In one example, the loading position 126 may correspond with a substantially horizontal position, such that the angle θ1 is approximately zero. In another example, the loading position 126 is at an acute angle θ1 relative to the base 104, and tilts the sub-assembly support 106 at an orientation that is easily accessible for loading a sub-assembly on the sub-assembly support 106 by an operator. The actuator 114 may be a pneumatic, hydraulic, electromagnetic, motorized, or other suitable releasably actuating and locking device.

The tool 102 may be formed of materials, including, but not limited to, metallic materials, such as steel or aluminum, composite materials, plastic materials, or other similar materials. In some examples, the sub-assembly support 106 and the base 104 are formed of the same materials. In other examples, the sub-assembly support 106 and the base 104 are formed of different materials.

Figure 5:
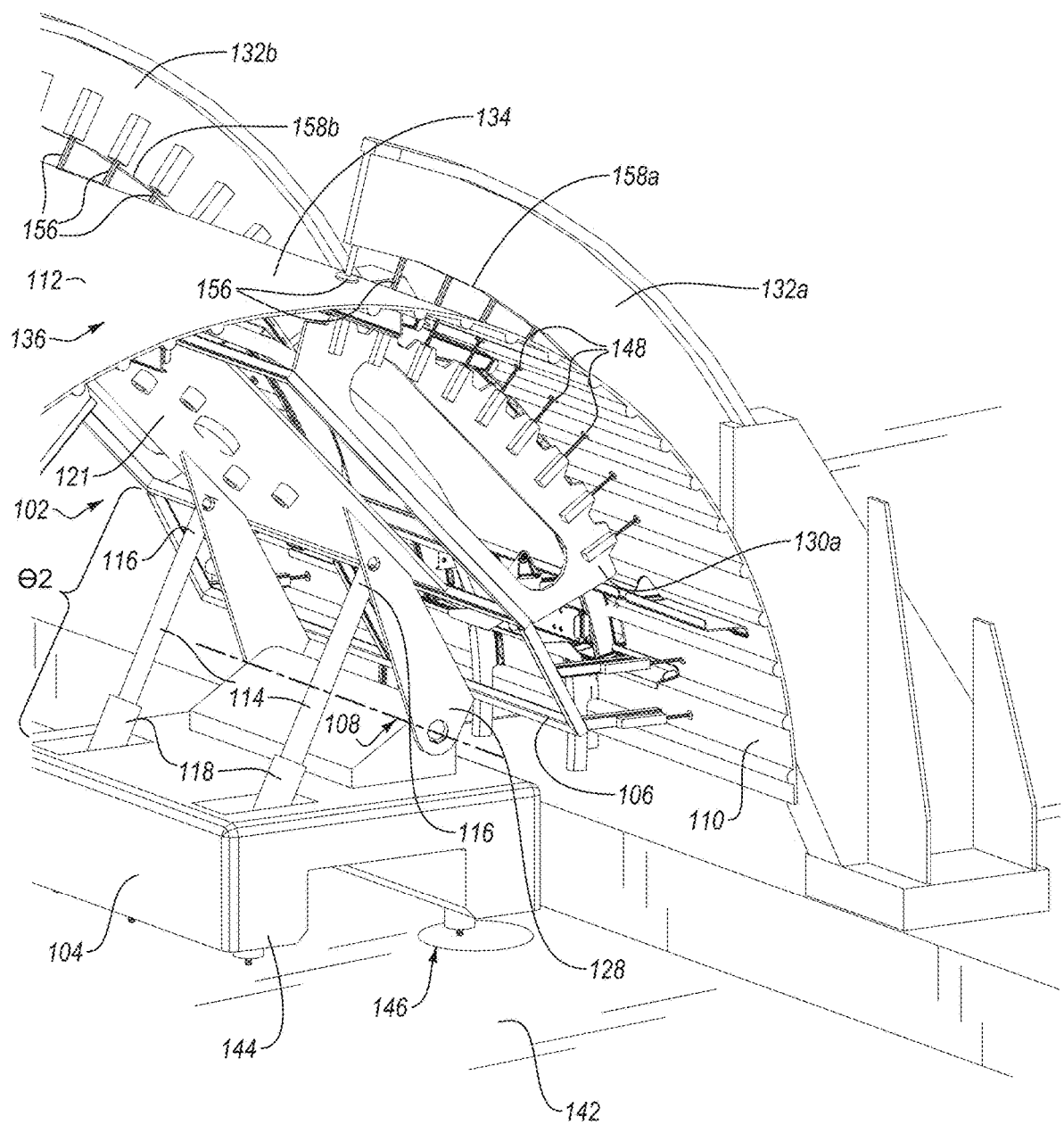
FIG. 5 is a schematic perspective view of a system for positioning a sub-assembly for installation to an assembling body, a tool in an install position and an interior conforming device and an exterior conforming device engaging the assembling body, according to one or more examples of the present disclosure.

Additionally, in certain examples, the tool 102 includes an interior conforming device 130 with multiple interior conforming device armatures 130a, 130b (see, e.g., FIG. 5). The interior conforming device 130 has an interfacing surface 150 that is configured to interface with an interior surface 110 of an assembling body 112. As used herein, with regards to surfaces, interface means that two or more surfaces are brought together in close proximity, including direct contact or indirect contact. Accordingly, the interior conforming device 130 is brought in close proximity to an interior surface 110 of an assembling body 112 when the tool 102 is in use. In some examples, the interfacing surface 150, defined by the interior conforming device 130, has a flat or planar surface. In other examples, the interfacing surface 150 of the interior conforming device 130 includes one or more contours or curved surfaces. The interior conforming device 130 can have any of various shapes or dimensions. However, the shape of the interfacing surface 150 corresponds with or complements the shape of the interior surface 110 of the assembling body 112. As defined herein, the interfacing surface 150 need not be a continuous surface and can be a collection of discontinuous or spaced apart surfaces, as shown in FIG. 1. Accordingly, in some examples, the interfacing surface 150 is the combination of multiple spaced apart surfaces where the contour of the interfacing surface 150 is defined by an extrapolated surface between and including the spaced apart surfaces.

The interior conforming device 130 further includes a plurality of pins 148 that extend from the interfacing surface 150. In some examples, as shown, each one of the plurality of pins 148 extends from a corresponding one of the spaced apart surfaces defining the interfacing surface 150. In one example, the plurality of pins 148 are permanently extended from the interfacing surface 150. In another example, the plurality of pins 148 are selectively retractable from the interfacing surface 150. The plurality of pins 148 can have any of various shapes or dimensions.

Figure 2:
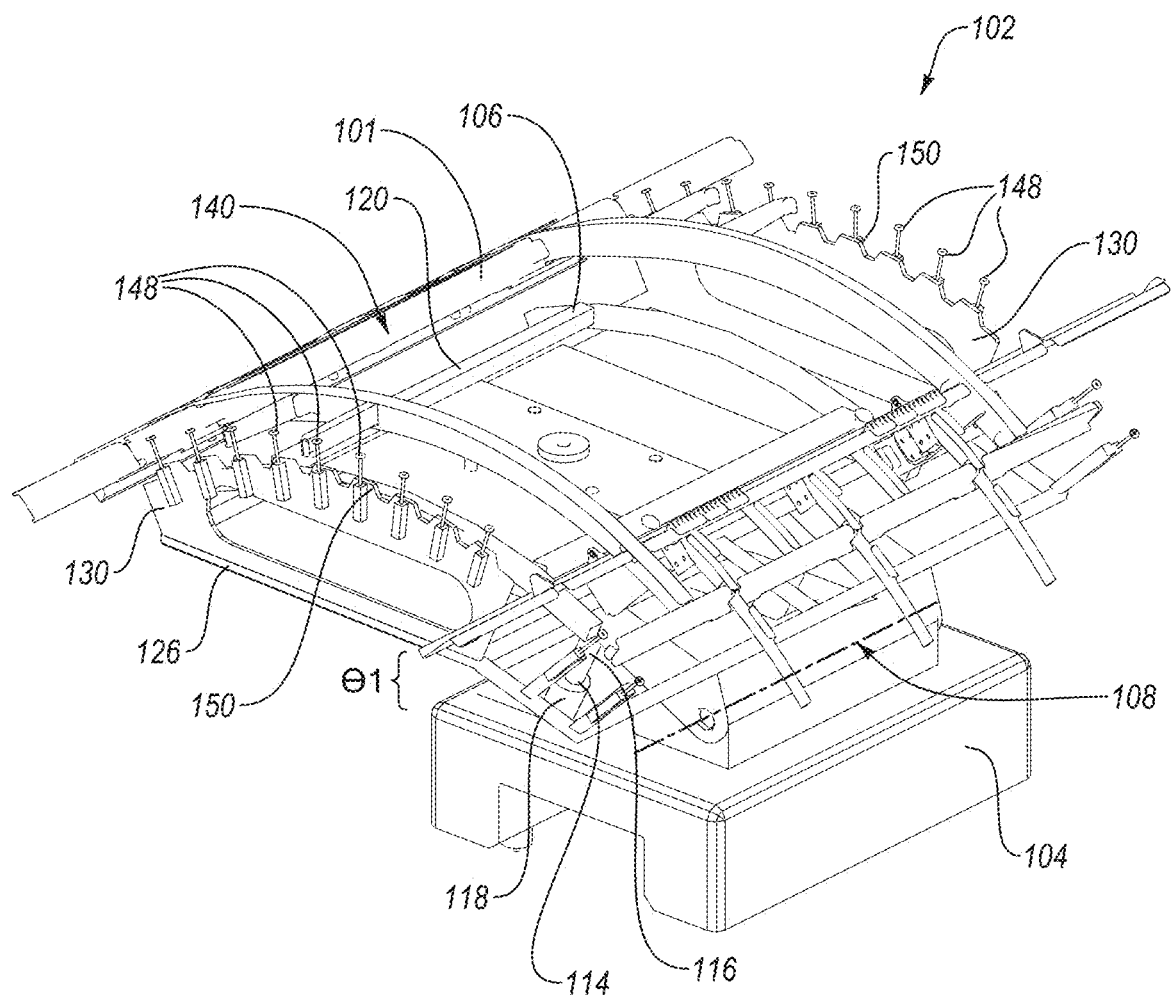
FIG. 2 is a schematic perspective view of a tool for positioning a sub-assembly for installation to an assembling body, a sub-assembly placed on the tool, according to one or more examples of the present disclosure.

As shown in FIG. 2, the tool 102 is used to support a sub-assembly 101 to be installed to an assembling body 112 (e.g., a main assembly or large structure, such as a vehicle). In certain examples, the assembling body 112 is an aircraft fuselage 136 (see, e.g., FIG. 4). As used herein, the assembling body 112 will be described in the context of an aircraft, however, it should be understood that the assembling body 112 could be any large structure. The sub-assembly 101 may be a door frame sub-assembly 140 that is configured to be installed in a door opening in the aircraft fuselage 136. The sub-assembly 101 is placed on the tool 102 while the tool 102 is in the loading position 126. In one example, the sub-assembly 101 is placed on the tool 102 as a complete structure. In another examples, the sub-assembly 101 is built or assembled while on the tool 102.

Figure 3:
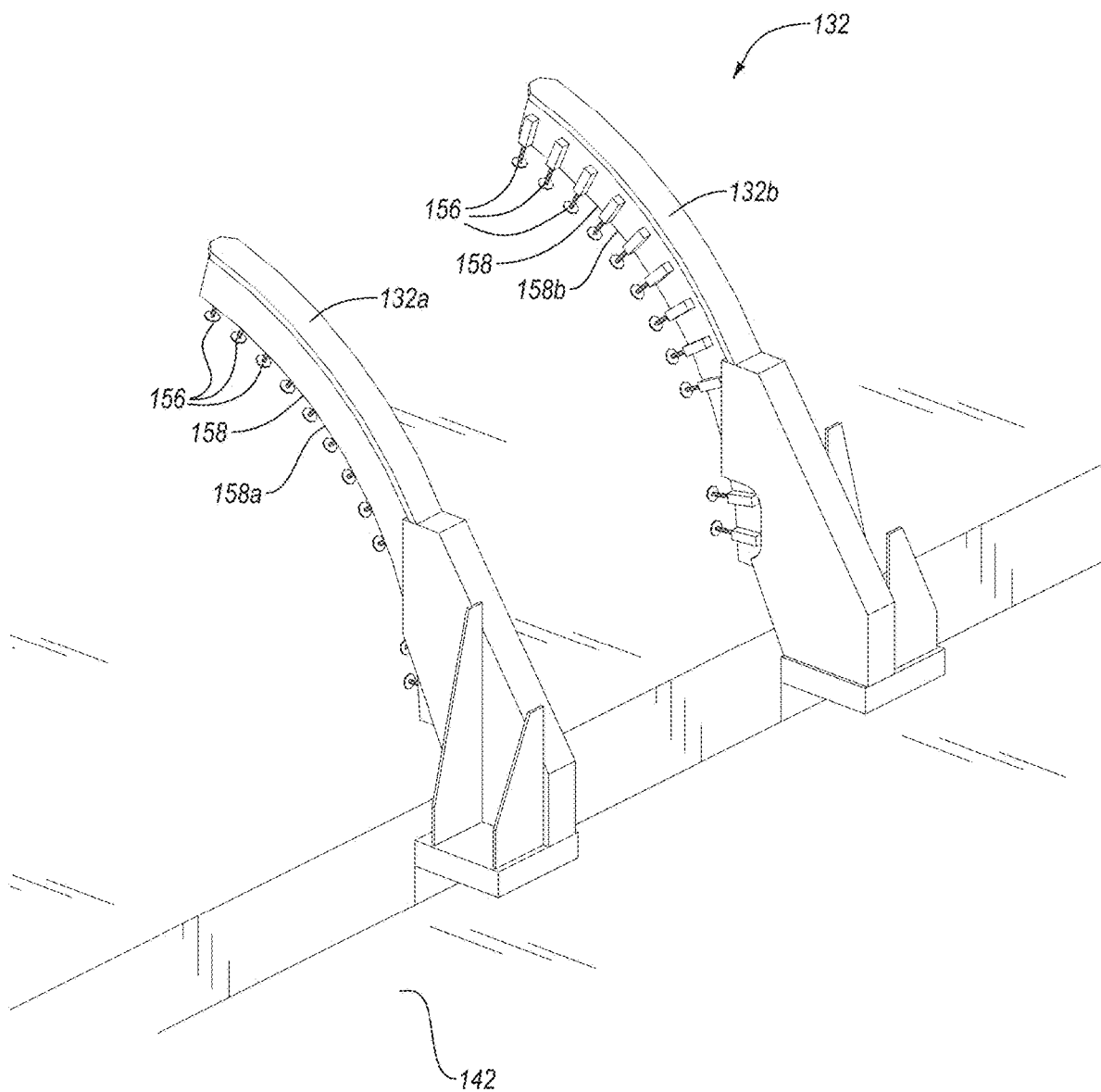
FIG. 3 is a schematic perspective view of an exterior conforming device, according to one or more examples of the present disclosure.

Referring to FIG. 3, the system 100 further includes exterior conforming devices 132. The exterior conforming devices 132 are discrete from the tool 102 and are positioned adjacent to an exterior surface 134 of the assembling body 112 (see, e.g., FIG. 4). Multiple exterior conforming device armatures 132a and 132b may be utilized to interface with the exterior surface 134 of the assembling body 112. In one example, the exterior conforming device 132, in conjunction with the interior conforming device 130, is used to maintain the shape of the assembling body 112 during attachment of the sub-assembly 101 to the assembling body 112. In other words, the interior conforming device 130 and the exterior conforming device 132 help ensure that the assembling body 112 maintains conformance to the desired contours of the assembling body 112 during an installation process on the assembling body 112, thus preventing deformation of the assembling body 112 due to the attachment of the sub-assembly 101 thereto. Accordingly, an interfacing surface 158 of the exterior conforming device 132, defined in a manner similar to the interfacing surface 150 of the interior conforming device 130, generally corresponds with or complements the exterior surface 134 of the assembling body 112. In another example, the interior conforming device 130 and the exterior conforming device 132 are used to alter the shape of the assembling body 112 during an installation process. Accordingly, the interfacing surface 158 of the exterior conforming device 132 and the interfacing surface 150 of the interior conforming device 130 does not correlate with an exterior surface 134 of the assembling body 112 before use, but alters the shape of the assembling body 112 during use.

The exterior conforming device 132 has a plurality of pins 156. The plurality of pins 156 extends from the interfacing surface 158, with each one of the plurality of pins 156 extending from a respective one of the spaced apart portions of the interfacing surface 158 in some examples. In one example, the plurality of pins 156 are permanently extended from the interfacing surface 158. In another example, the plurality of pins 156 are selectively retractable from the interfacing surface 158. The plurality of pins 156 can have any of various shapes or dimensions. A first exterior conforming device armature 132a has a first interfacing surface 158a and a second exterior conforming device armature 132b has a second interfacing surface 158b.

Figure 4:
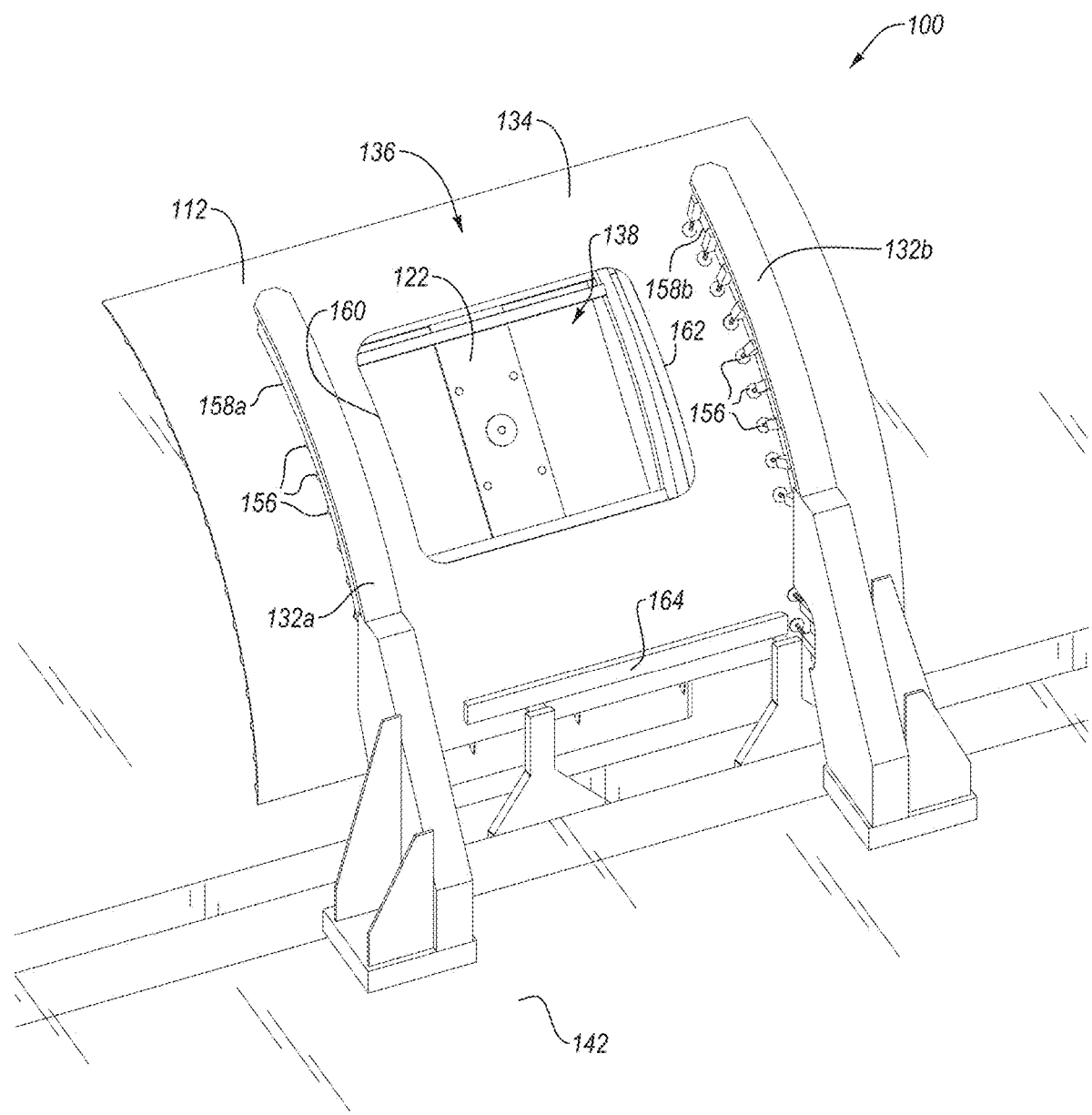
FIG. 4 is a schematic perspective view of a system for positioning a sub-assembly for installation to an assembling body, an exterior conforming device on the exterior surface of the assembling body and a tool visible through an opening in the assembling body, according to one or more examples of the present disclosure.

As shown in FIG. 4, the exterior conforming device 132 is configured to interface with the exterior surface 134 of the assembling body 112. The assembling body 112 includes an opening 122. The opening 122 is sized and shaped for installation of the sub-assembly 101. The opening 122 may be a door frame opening 138 for an aircraft fuselage 136. As shown, multiple exterior conforming device armatures 132a and 132b are positioned adjacent to the exterior surface 134 on either side of the opening 122. A first exterior conforming device armature 132a is positioned on a first exterior side 160 of the opening 122. The first exterior conforming device armature 132a includes a plurality of pins 156 extending from the first interfacing surface 158a and configured to contact the first exterior side 160 of the opening 122. A second exterior conforming device armature 132b is positioned on a second exterior side 162 of the opening 122. The second exterior conforming device armature 132b includes a plurality of pins 156 extending from the second interfacing surface 158b and configured to contact the second exterior side 162 of the opening 122. The first exterior side 160 spaced apart from the second exterior side 162. In one example, the first exterior side 160 is on the opposite side of the opening 122 from the second exterior side 162.

The exterior conforming device 132 is supported by a floor 142 and may be fixed to the floor 142 adjacent to the exterior surface 134 of the assembling body 112, such that the exterior conforming device 132 can interface with the assembling body 112 without adjustment. Alternatively, the exterior conforming device 132 may be selectively movable about the floor 142 relative to the exterior surface 134 of the assembling body 112. The exterior conforming device 132 may be movable in multiple directions including, toward and back from the assembling body 112 or along the length of the assembling body 112. Additionally, the exterior conforming device 132 may be extendable.

The assembling body 112 may be attached to a conveyor system 164 in some examples as shown in FIG. 4. The conveyor system 164 moves the assembling body 112 through an assembly line, such as a pulse line. The assembling body 112 remains at a location shown in FIG. 4 during the positioning and installation of the sub-assembly 101 and other necessary work and then is pulsed to the next location along the assembly line. The positioning and installation of the sub-assembly 101 using the system 100 improves the efficiency of the processes and enables the installation of the sub-assembly 101 in one single step.

Referring to FIG. 5, an implementation of the system 100 is shown. The system 100 includes a tool 102 with an interior conforming device 130 having multiple interior conforming device armatures 130a and 130b and an exterior conforming device 132 having multiple exterior conforming device armatures 132a and 132b. The interior conforming device armatures 130a and 130b are contacting the interior surface 110 of the assembling body 112. The exterior conforming device armatures 132a and 132b are contacting the exterior surface 134 of the assembling body 112. Thus, the interior conforming device armatures 130a and 130b and the exterior conforming device armatures 132a and 132b work in combination to contact the assembling body 112 from the interior surface 110 and exterior surface 134, respectively, to help maintain the shape of or to change the shape of the assembling body 112. The tool 102 includes multiple actuators 114 that are activated to tilt the first surface 120 of the sub-assembly support 106 toward the opening 122 in the assembling body 112. The sub-assembly support 106 is in the install position 128 in which the sub-assembly support 106 defines an angle $\theta2$ relative to the base 104. The angle $\theta2$ is greater than the angle $\theta1$. The install position 128 is the position in which the sub-assembly 101 can be supported by the sub-assembly support 106 while the sub-assembly 101 is installed to the opening 122.

The tool 102 is selectively movable relative to the interior surface 110 of the assembling body 112 along the floor 142 beneath the tool 102. In one example, the tool 102 is selectively movable using an automatic guide vehicle 144. The base 104 may incorporate the automatic guide vehicle 144. Alternatively, the base may be attached to an automatic guide vehicle 144. The automatic guide vehicle 144 is configured to move the tool 102 adjacent to the interior surface 110 of the assembling body 112 by sensing at least one reference guide 146 on the floor 142. The reference guides 146 may be any marking the automatic guide vehicle 144 can follow, including but not limited to, marked long lines or wires on the floor 142.

Figure 6:
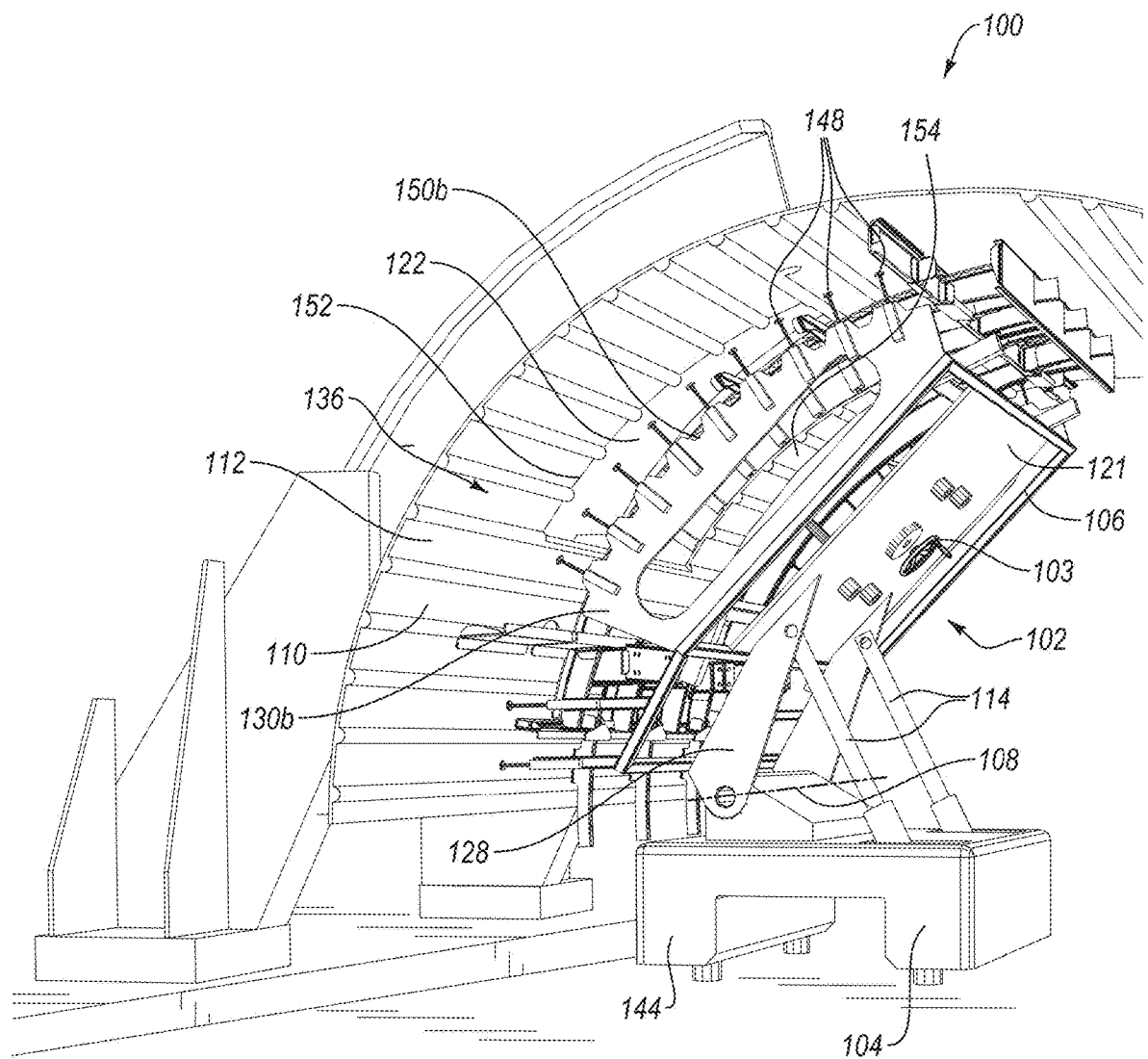
FIG. 6 is a schematic perspective view of a system for positioning a sub-assembly for installation to an assembling body, the tool in an install position, according to one or more examples of the present disclosure.

Referring to FIG. 6, multiple interior conforming device armatures 130a and 130b of the interior conforming device 130 are configured to interface with the interior surface 110 of the assembling body 112. The assembling body 112 includes the opening 122. The first interior conforming device armature 130a includes a plurality of pins 148 that can extend from an interfacing surface 150a and configured to contact a first interior side 152 of the opening 122 of the assembling body 112. The second interior conforming device armature 130b also includes a plurality of pins 148 extending from an interfacing surface 150b and configured to contact a second interior side 154 of the opening 122 of the assembling body 112. The first interior side 152 spaced apart from the second interior side 154. In one example, the first interior side 152 is on the opposite side of the opening 122 from the second interior side 154.

The tool 102 may include an adjustment wheel 103. In one example, the adjustment wheel 103 is on a second surface 121 of the sub-assembly support 106, which is opposite the first surface 120 of the sub-assembly support 106. The adjustment wheel 103 is used to make adjustments to the position of sub-assembly support 106 relative to the opening 122 while the sub-assembly support 106 is in the install position 128. In one example, the adjustment wheel 103 can adjust the orientation or position of the sub-assembly support 106, relative to the opening 122, with multiple degrees of freedom, such as up and down, left and right, or forward and backward. In another example, the adjustment wheel 103 can be adjusted to adjust with six degrees of freedom (e.g., in three translations (forward/backward, up/down, left-right) and three rotations (pitch, yaw, and roll), thus allowing an even more accurate positioning of the sub-assembly support 106 relative to the opening 122.

Figure 7:
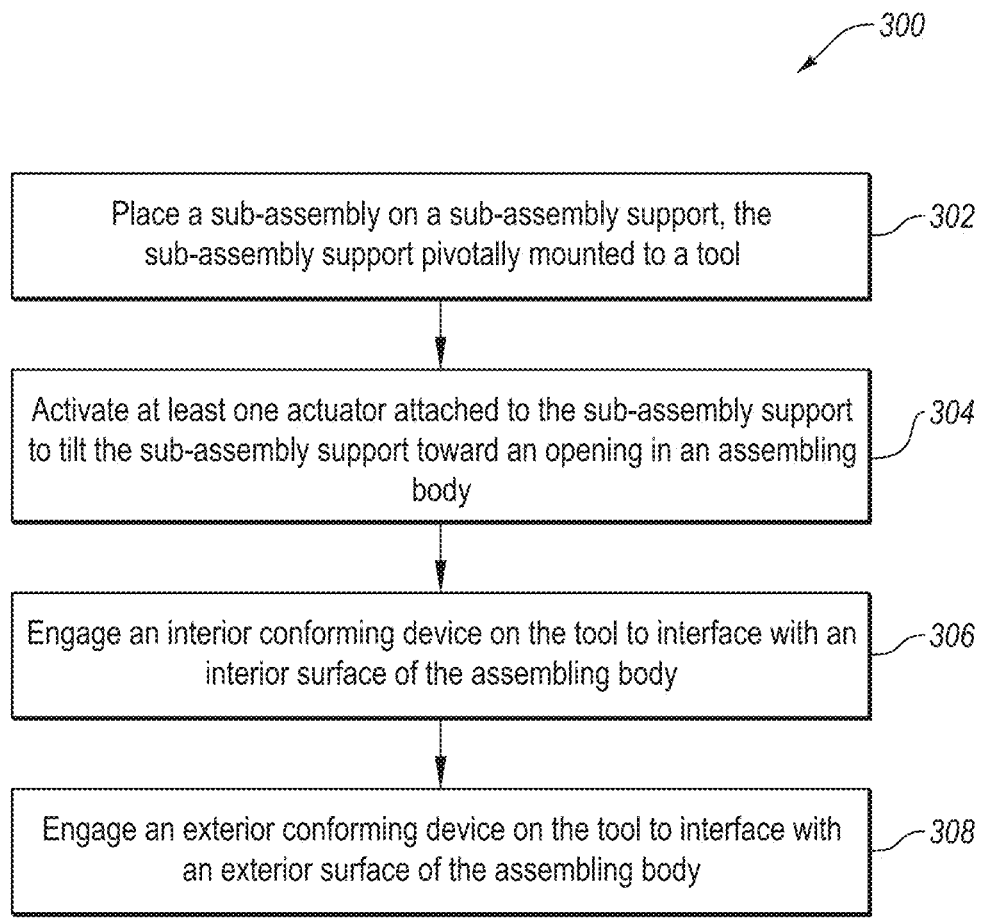
FIG. 7 is a schematic flow diagram of a method for positioning a sub-assembly for installation to an assembling body, according to one or more examples of the present disclosure.

Referring to FIG. 7, according to one example, a method 300 for positioning a sub-assembly 101 for installation includes (block 302) placing a sub-assembly 101 on a sub-assembly support 106. The sub-assembly support 106 is positioned above a base 104 of a tool 102. The sub-assembly support 106 is pivotably mounted at a pivot axis 108 to the base 104. The method 300 also includes (block 304) activating at least one actuator 114 attached to the sub-assembly support 106 and the base 104. The actuator 114 tilts a first surface 120 of the sub-assembly support 106 along the pivot axis 108 and tilts the sub-assembly support 106 toward an opening 122 in an assembling body 112. The method 300 further includes (block 306) engaging an interior conforming device 130 attached to the tool 102 to interface with an interior surface 110 of the assembling body 112. The method 300 additionally includes (block 308) engaging an exterior conforming device 132, discrete from the tool 102, and adjacent to an exterior surface 134 of the assembling body 112 to interface with the exterior surface 134 of the assembling body 112.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for positioning a sub-assembly for installation, the system comprising: a tool comprising a base and a sub-assembly support, the sub-assembly support positioned above the base and pivotably mounted to the base at a pivot axis, the tool positioned adjacent to an interior surface of an assembling body and configured to support a sub-assembly; at least one actuator comprising a first end, attached to the sub-assembly support, and a second end, attached to the base, the at least one actuator selectively operable to tilt a first surface of the sub-assembly support toward an opening in the assembling body and adjust an angle of the sub-assembly support relative to the base, wherein the sub-assembly support is selectively adjustable between a loading position, distant from the opening in the assembling body, and an install position, adjacent to the opening in the assembling body, wherein the sub-assembly support further comprises an adjustment wheel that is selectively adjustable to move the first surface of the sub-assembly support, relative to the assembling body, into the install position, and wherein the adjustment wheel is configured to make adjustments to a position of the sub-assembly support with multiple degrees of freedom relative to the opening while the sub-assembly support is in the install position; an interior conforming device attached to the tool, wherein the interior conforming device is configured to interface with the interior surface of the assembling body when the sub-assembly support is in the install position; and an exterior conforming device discrete from the tool and positioned adjacent to an exterior surface of the assembling body, wherein the exterior conforming device is configured to interface with the exterior surface of the assembling body.

2. The system of claim 1, wherein:
the interior conforming device comprises a plurality of pins;
the plurality of pins permanently extend from an interfacing surface of the interior conforming device; and
the plurality of pins is configured to contact the interior surface of the assembling body.

3. The system of claim 1, wherein:
the interior conforming device comprises a plurality of pins;
the plurality of pins selectively retractable from an interfacing surface of the interior conforming device; and
the plurality of pins is configured to contact the interior surface of the assembling body.

4. The system of claim 1, wherein:
the interior conforming device comprises a first interior conforming device armature and a second interior conforming device armature;
the first interior conforming device armature is configured to interface with the interior surface on a first side of the opening in the assembling body; and the second interior conforming device armature is configured to interface with the interior surface on a second side, spaced apart from the first side, of the opening in the assembling body.

5. The system of claim 1, wherein:
the exterior conforming device comprises a plurality of pins;
the plurality of pins selectively retractable from an interfacing surface of the exterior conforming device; and
the plurality of pins is configured to contact the exterior surface of the assembling body.

6. The system of claim 1, wherein:
the exterior conforming device comprises a first exterior conforming device armature and a second exterior conforming device armature;
the first exterior conforming device armature is configured to interface with the exterior surface on a first exterior side of the opening in the assembling body; and
the second exterior conforming device armature is configured to interface with the exterior surface on a second exterior side, spaced apart from the first exterior side, of the opening in the assembling body.

7. The system of claim 1, wherein the exterior conforming device is fixed relative to the exterior surface of the assembling body.

8. The system of claim 1, wherein the exterior conforming device is selectively movable relative to the exterior surface of the assembling body.

9. The system of claim 1, wherein:
the assembling body is secured to a conveyor system attached to the floor; and
the assembling body is moved along the conveyor system at a specified pulse rate.

10. The system according to claim 1, wherein the adjustment wheel is selectively adjustable to change an orientation and a position of the first surface of the sub-assembly support relative to the assembling body.

11. The system of claim 1, wherein the assembling body is an aircraft fuselage.

12. The system of claim 11, wherein:
the opening in the assembling body is a door frame opening;
the sub-assembly is a door frame sub-assembly; and
the tool is configured to position the door frame sub-assembly within the door frame opening of the aircraft fuselage.

13. The system of claim 1, wherein the tool is selectively movable relative to the interior surface of the assembling body along a floor beneath the tool.

14. The system of claim 13, further comprises an automated guide vehicle, wherein:
the tool is selectively movable using the automated guide vehicle; and
the automated guide vehicle is configured to move the tool adjacent to the interior surface of the assembling body by sensing at least one reference guide on the floor beneath the tool.

15. A system for positioning a sub-assembly for installation, the system comprising: a tool comprising a base and a sub-assembly support, the sub-assembly support positioned above the base and pivotably mounted to the base at a pivot axis, the tool positioned adjacent to an interior surface of an assembling body; at least one actuator comprising a first end, attached to the sub-assembly support, and a second end, attached to the base, the at least one actuator selectively operable to tilt a first surface of the sub-assembly support toward an opening in the assembling body and adjust an angle of the sub-assembly support relative to the base, wherein the sub-assembly support is selectively adjustable between a loading position, distant from the opening in the assembling body, and an install position, adjacent to the opening in the assembling body, wherein the sub-assembly support further comprises an adjustment wheel that is selectively adjustable to move the first surface of the sub-assembly support, relative to the assembling body, into the install position, and wherein the adjustment wheel is configured to make adjustments to a position of the sub-assembly support with multiple degrees of freedom relative to the opening while the sub-assembly support is in the install position; a first interior conforming device armature attached to the tool, the first interior conforming device armature comprising a plurality of pins selectively retractable from an interfacing surface and configured to interface with the interior surface on a first side of the opening in the assembling body when the sub-assembly support is in the install position; a second interior conforming device armature attached to the tool, the second interior conforming device armature comprising a plurality of pins selectively retractable from an interfacing surface and configured to interface with the interior surface on a second side, apart from the first side, of the opening in the assembling body when the sub-assembly support is in the install position; a first exterior conforming device armature discrete from the tool and positioned adjacent to an exterior surface of the assembling body, the first exterior conforming device armature comprising a plurality of pins selectively retractable from an interfacing surface and configured to interface with the exterior surface on a first exterior side of the opening in the assembling body; and a second exterior conforming device armature discrete from the tool and positioned adjacent to the exterior surface of the assembling body, the second exterior conforming device armature comprising a plurality of pins selectively retractable from an interfacing surface and configured to interface with the exterior surface on a second exterior side of the opening in the assembling body.

16. A method for positioning a sub-assembly for installation, the method comprising:
placing a sub-assembly on a sub-assembly support, the sub-assembly support positioned above a base of a tool and pivotably mounted at a pivot axis to the base;
activating at least one actuator attached to the sub-assembly support and the base to tilt a first surface of the sub-assembly support along the pivot axis, the sub-assembly support tilting toward an opening in an assembling body;
engaging an interior conforming device attached to the tool to interface with an interior surface of the assembling body;
engaging an exterior conforming device adjacent to an exterior surface of the assembling body to interface with the exterior surface of the assembling body;
adjusting an adjustment wheel on the sub-assembly support to bring the first surface of the sub-assembly support to an install position, adjacent to the opening in the assembling body;
installing the sub-assembly support to the opening in the assembling body; and
activating the at least one actuator to pivot the first surface of the sub-assembly support away from the opening in the assembling body to decline the sub-assembly support to a loading position.

17. The method of claim 16, further comprising:
moving the tool along a floor, beneath the tool, using an automated guide vehicle; and
guiding the automated guide vehicle adjacent to the interior surface of the assembling body by sensing at least one reference guide on the floor.

18. The method of claim 16, further comprising extending a plurality of pins from an interfacing surface of the interior conforming device to contact the interior surface of the assembling body when the sub-assembly support is in an install position.

19. The method of claim 16, further comprising moving the exterior conforming device adjacent to the exterior surface of the assembling body.

20. The method of claim 16, further comprising extending a plurality of pins from an interfacing surface of the exterior conforming device to contact the exterior surface of the assembling body when the sub-assembly support is in an install position.

* * * * *